United States Patent
Crane et al.

(10) Patent No.: US 6,664,948 B2
(45) Date of Patent: Dec. 16, 2003

(54) TRACKING POINTING DEVICE MOTION USING A SINGLE BUFFER FOR CROSS AND AUTO CORRELATION DETERMINATION

(75) Inventors: Randall T. Crane, Fort Collins, CO (US); Brian L. Hastings, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 09/918,911

(22) Filed: Jul. 30, 2001

(65) Prior Publication Data

US 2003/0058218 A1 Mar. 27, 2003

(51) Int. Cl.[7] .............................. G09G 5/08; G06K 9/22; G06K 7/10
(52) U.S. Cl. ........................ 345/166; 345/163; 382/313; 382/321
(58) Field of Search ................................. 345/156, 157, 345/158, 159, 163, 169; 382/312, 313, 321

(56) References Cited

U.S. PATENT DOCUMENTS

| | | | |
|---|---|---|---|
| 4,631,400 A | * 12/1986 | Tanner et al. | 250/221 |
| 4,794,384 A | * 12/1988 | Jackson | 345/166 |
| 5,355,146 A | * 10/1994 | Chiu et al. | 345/156 |
| 5,644,139 A | 7/1997 | Allen et al. | 250/557 |
| 5,729,008 A | * 3/1998 | Blalock et al. | 250/208.1 |
| 5,994,710 A | * 11/1999 | Knee et al. | 250/557 |
| 6,172,354 B1 | 1/2001 | Adan et al. | 250/221 |
| 6,195,475 B1 | 2/2001 | Beausoleil, Jr. et al. | 382/312 |
| 6,249,360 B1 | * 6/2001 | Pollard et al. | 358/473 |
| 2002/0190953 A1 | * 12/2002 | Gordon et al. | 345/166 |

FOREIGN PATENT DOCUMENTS

DE 195 19 124 A1 11/1996

* cited by examiner

Primary Examiner—Xiao Wu
Assistant Examiner—M. Fatahiyar
(74) Attorney, Agent, or Firm—Ronald M. Anderson

(57) ABSTRACT

Cross correlation between a reference image frame and a comparison image frame determine the direction of motion relative to x and y orthogonal axes for a pointing device that uses optical imaging to monitor movement relative to a surface. Pixel data for a portion of the surface are loaded into a buffer memory that shifts the data between successive positions in the buffer memory as each pixel of a comparison frame is processed to compute cross correlation. Auto correlation is determined for positions in the reference frame and used with the cross correlation results to determine a sub-pixel interpolation for the movement of the pointing device. A new reference frame is loaded using data for the comparison frame currently being processed if the pointing device is moved sufficiently so that the next comparison frame will not overlap the existing reference frame.

52 Claims, 9 Drawing Sheets

SURFACE UNDERLYING
MOUSE  ~210

MOUSE MOVING OVER
SURFACE AT 2 PIXELS/FRAME  ~210

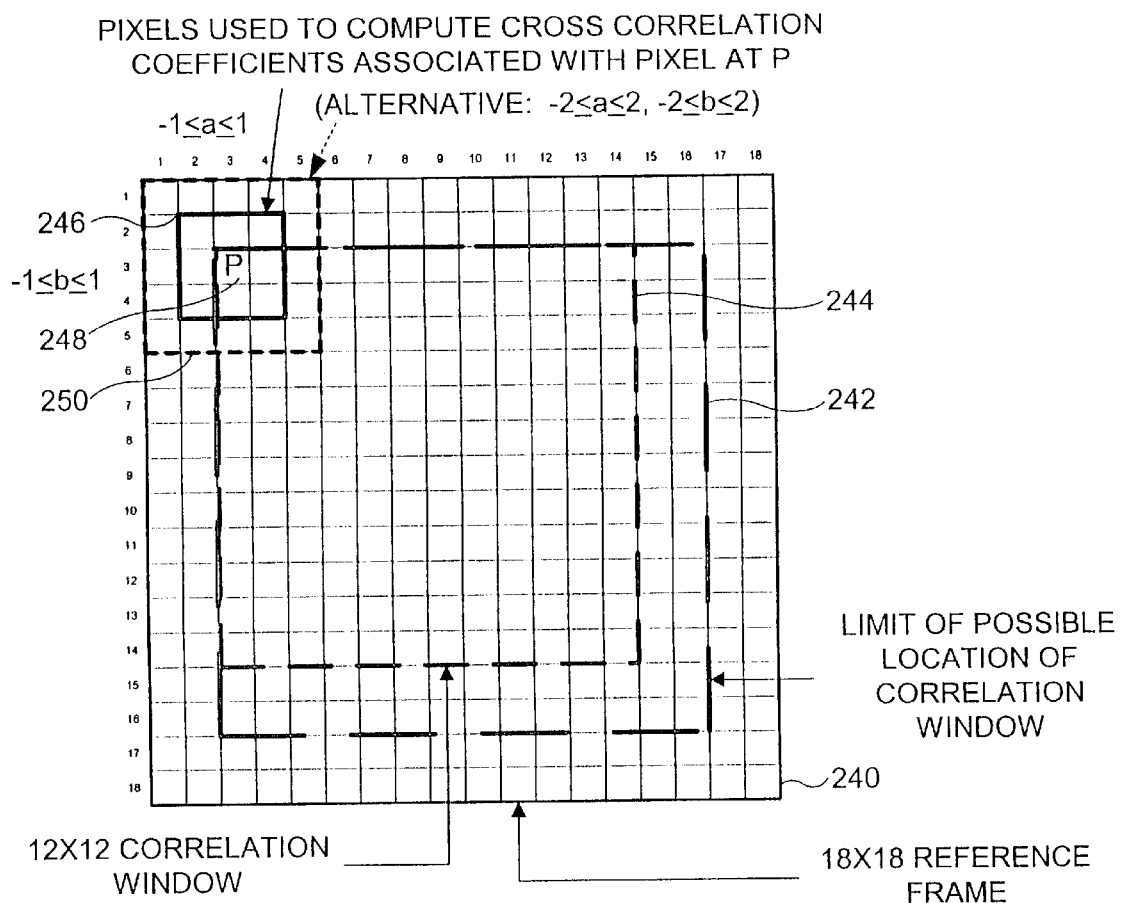
FIG. 11
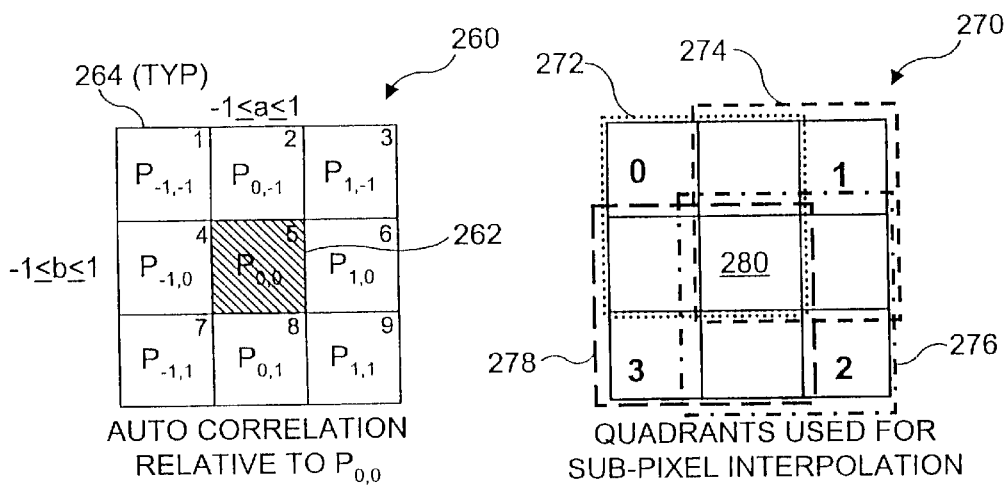
FIG. 12A     FIG. 12B

US 6,664,948 B2

TRACKING POINTING DEVICE MOTION USING A SINGLE BUFFER FOR CROSS AND AUTO CORRELATION DETERMINATION

FIELD OF THE INVENTION

This invention generally relates to tracking relative motion between a device and an adjacent surface using an optical detector circuit that responds to changes in images of the surface, and more specifically, to producing a signal indicative of the relative motion as a function of a cross correlation between a reference image and a comparison image, and an auto correlation of the reference image, where only pixel data for the reference image are retained in a memory.

BACKGROUND OF THE INVENTION

A "mechanical" mouse is the most common type of pointing device used for controlling a cursor and other graphic components on a computer display. Typically, to detect the motion of the mouse over a surface, a ball captured within a cavity on the bottom of the mouse contacts the surface and rotates as the mouse is moved over the surface by the user. The rotational movement of the ball in the cavity is transferred to two rollers that contact the ball. Shafts on which the rollers are mounted are coupled to rotary motion encoders. The rollers are orthogonally positioned relative to each other so that signals from the encoders correspond to orthogonal X axis and Y axis components of motion, where these two axes are determined relative to the mouse orientation. The ΔX and ΔY components of motion derived from the encoder signals are input to a personal computer (PC) or other computing device through a serial port, a personal system/2 (PS/2) port, a bus mouse port, or a universal serial bus (USB) port and used to control a cursor or other graphical object on a display screen. A mouse also usually includes two or more switches that produce state signals when actuated by a user and may include a rotary wheel that is coupled to yet another rotational encoder and a state switch for controlling scrolling of the contents of a display window and/or other functions. A related type of pointing device called a "track ball" also employs a ball to actuate rotational encoders, but the ball is exposed on the upper surface of this pointing device so that it is movable by the user's fingers or hand, while the housing in which the ball is captive remains generally fixed in position.

The mechanical mouse described above can produce an erratic signal if the ball and rotational encoder rollers are not periodically cleaned to remove deposits that tend to buildup where the rollers contact the ball. Also, the ball may not roll properly over a slick surface, causing errors in tracking the motion of the mouse. More recently, an "optical" mouse has been developed that avoids most of the problems associated with the use of a rotatable ball in a mechanical mouse. In contrast to a mechanical mouse, an optical mouse does not include a rotatable ball in the mouse, but instead tracks the motion of the mouse by imaging the surface over which the mouse is being moved. An earlier version of an optical mouse sold by Mouse Systems, Inc. employed a special mouse pad having a reflective surface and included an orthogonal grid of closely spaced lines. Motion of this earlier type of optical mouse was detected by sensing the variations in the intensity of light reflected from the special surface, caused by the grid lines, and interpolating to resolve motion with a greater resolution than the grid spacing. In contrast, a more recently developed optical mouse sold by Microsoft Corporation is able to track movement of the device over most surfaces, thereby eliminating the need for any special surface or pad. Details of this type of optical mouse are disclosed in commonly assigned U.S. Pat. No. 6,172,354, which issued on Jan. 9, 2001. To detect motion, the optical mouse described in this patent employs a red light emitting diode (LED) source to illuminate the adjacent surface over which the mouse is being moved. A two-dimensional array of variable sensitivity photo detectors (i.e., an artificial retina) in the base of the optical mouse produces a pixel image of a portion of the surface in response to the red light reflected from the surface. The image signals from the photo detectors are periodically stored as pixel data in two different image buffers. These data are processed to determine a cross correlation from which a ΔX component and ΔY component of the mouse movement can be determined as a function of the cross correlation results.

Two image buffers are used in the prior art optical mouse to determine the cross correlation, including one that stores an N×N pixel reference frame image, and another that stores an M×M comparison frame image of the portion of the surface over which the mouse is moved. Each pixel in a region of interest in the reference frame is read and compared with all pixels in the region of interest in the comparison frame to determine a cross correlation of the two image buffers. The result of this comparison is input to a correlation array. Each component of the correlation array includes the sum of the differences for a different offset between the comparison and reference frames. The differences are accumulated by processing the pixels stored in the comparison frame buffer against those stored in the reference frame buffer, which generally requires a total of M×M× N×N operations, as typically implemented in the prior art. As a result, the process to determine cross correlation in this prior art approach is both slow and computationally intensive. In addition, the process requires that two relatively expensive, moderately large memory arrays be provided to store the reference image frame and the comparison image frame data. All processing is done within circuitry included in the mouse, so that the signal sent to the computer for use in controlling a cursor of other portions of a display in response to the movement of the optical mouse is generally equivalent to that produced by a mechanical mouse. The movement signal is formatted to connect to a PS/2 port or a USB port. The maximum velocity of mouse movement that this prior art optical sensing system can accurately track is about 18 inches/sec.

Image recognition systems typically use cross correlation and auto correlation to determine the disposition of an object relative to a background. Such systems also normally use two memory arrays, one to store a reference image frame and another to store a comparison image frame, just as in the optical mouse currently sold by Microsoft Corporation. To reduce the cost of an optical mouse, it would be preferable to employ an application specific integrated circuit (ASIC) processing chip within the mouse that does not require two distinct memory arrays to store the reference and comparison frames used to determine cross correlation. It would be desirable to achieve better tracking performance by using such an optical mouse and desirable to determine the movement of the mouse using sub-pixel interpolation.

Accordingly, there is clearly motivation to develop a new approach for determining correlation that can achieve the desired more efficient tracking capability, with less demand for processing cycles, and at a lower cost than the current approach. This new approach should also achieve a lower cost by using only a single buffer memory rather than the two memory arrays normally required in calculating correlation.

SUMMARY OF THE INVENTION

In a pointing device that employs an optical imaging sensor for monitoring movement relative to a surface, successive image frames are compared to determine the direction and extent of the movement. The imaging sensor produces a signal corresponding to pixel image data for the adjacent surface. Image data for a reference frame are stored in a specialized memory buffer for use in determining a cross correlation with a comparison frame that is subsequently acquired by imaging the surface. Successive pixels of the comparison frame are processed to determine components of the cross correlation as the reference frame data are shifted through the buffer memory. Each component of the cross correlation represents the absolute value of a difference between a pixel of the comparison frame and pixels around a related pixel in the reference frame, and these components correspond to the various different directions in which the relative movement might occur. The cross correlation component having the minimum value indicates the direction of the relative movement.

In a conventional approach to determining the relative movement between an object and an adjacent surface, a separate memory array would be provided for storing successive comparison frames and for storing a reference frame. However, in the present invention, only the reference frame is stored in memory. As a result, the cost of the pointing device is substantially reduced since it is not necessary to provide a memory array for the comparison frame. Instead, the image data for the successive comparison frames are processed a pixel at a time, as the data are read from the imaging sensor, so there is no need to retain the image data for a comparison frame—unless used to provide a new reference frame.

The present invention also includes the step of determining an auto correlation using the image data for the reference frame stored in the memory buffer. A sub-pixel interpolation of the relative movement is then determined as a function of the auto (and cross) correlation. Also, since auto correlation is determined in parallel with cross correlation, processing of the image data is very efficient. As each pixel in the image data for the comparison frame is read from the imaging sensor, the buffer memory is selectively reloaded with image data for the reference frame that was previously loaded therein. The image data for the reference frame are shifted through the buffer memory as successive pixels of the comparison frame are read from the imaging sensor. However, at times, it will be necessary to load the buffer memory with a new reference frame using the image data for the comparison frame that is currently being read from the imaging sensor. Since the relative movement between the pointing device and the surface is monitored over time, the velocity of the relative movement is readily calculated in the pointing device. The buffer memory is then loaded with image data from the comparison frame as necessary to ensure that a meaningful cross correlation can be determined in subsequent frames. The need to load a new reference frame into the buffer memory is determined as a function of the velocity of motion. Specifically, the relative position is extrapolation by adding a distance corresponding to the velocity to the current position. For example, the position one frame away can be approximated by using the velocity to determine the distance that will be traveled during the time for the next frame to be acquired to the current position.

The intent is to load a new reference frame into the buffer memory before the relative movement between the pointing device and the surface is sufficient to cause a subsequent comparison frame to no longer overlap the reference frame previously stored in the buffer memory.

Additional temporary storage is provided in the buffer memory for the last portion of the image data of a previous reference frame, so that the last portion of the image data of the previous reference frame remains available for use in determining the cross correlation as the image data for the current reference frame are loaded into the buffer memory to become the new reference frame. Image data for the previous reference frame are discarded as the new reference frame is loaded.

Another aspect of the present invention is directed to machine readable medium that stores a plurality of machine instructions for performing the steps of the method described above.

Yet another aspect of the present invention is directed to a pointing device that produces an output signal indicative of a relative movement between at least a portion of the pointing device and an adjacent surface. The pointing device includes an imaging detector that produces a signal corresponding to an image of the adjacent surface, an electronic switch having a first input to receive the signal from the imaging detector and a second input, a sequential memory buffer, and a processing circuit that generally carries out the steps of the method described above.

A still further aspect of the present invention is directed to a method for determining a sub-pixel interpolation component of the relative movement between an object and an adjacent surface. In this method, a signal corresponding to a pixelated image of the surface is produced, and a reference frame for the surface that includes data for each of a plurality of pixels of the pixelated image is stored in memory. As relative movement occurs between the object and the adjacent surface, a comparison frame is produced that includes data for a plurality of pixels in a new pixelated image. The cross correlation between the data for the reference frame and the data for the comparison frame, as well as an auto correlation of the data in the reference frame are then determined. Finally, the sub pixel interpolation component of the relative movement is determined as a function of both the cross correlation and the auto correlation.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

FIG. 11 schematically illustrates a reference frame stored in the memory buffer and identifies one position of a correlation window, as well as indicating the limits for other possible locations of the correlation window in the reference frame;

FIG. 12A is a schematic diagram of a 3×3 array of pixels, identifying the pixel positions used in determining the components of auto correlation for each successive pixel in the reference frame; and FIG. 12B is a schematic diagram identifying the pixels included in each of the four quadrants used to determine the equation that is employed for calculating sub-pixel interpolation.

DESCRIPTION OF THE PREFERRED EMBODIMENT

Exemplary Operating Environment

Figure 1:
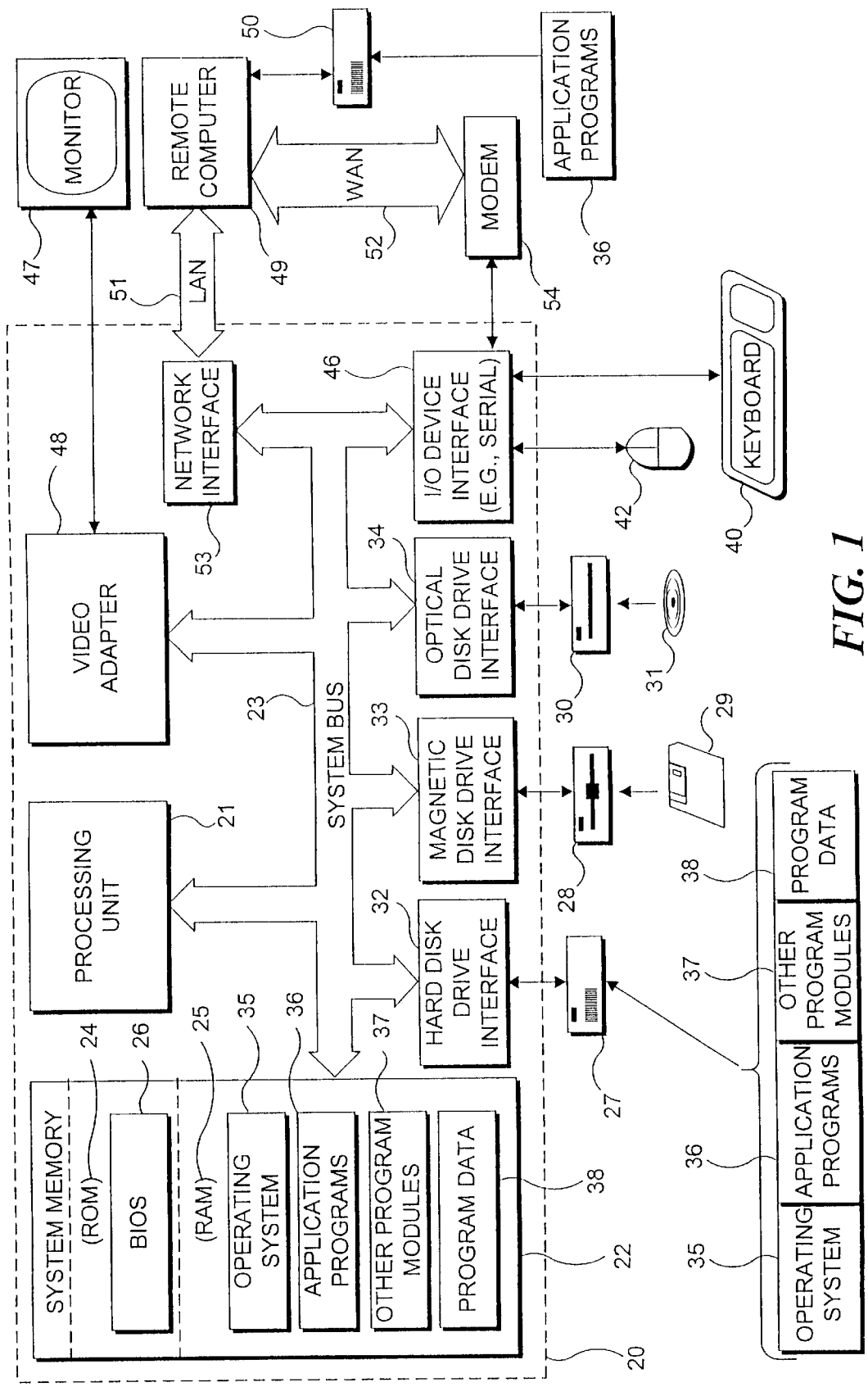
FIG. 1 is a block diagram of an exemplary system for a general purpose computing device in the form of a conventional personal computer and a pointing device that implements the present invention.

FIG. 1 and the following discussion provide a brief, general description of an exemplary computing environment with which the present invention may be employed. Although not necessarily limited to such an application, the present invention will be described in connection with its use as an input device for providing a user-controlled input signal to a PC. This signal can be acted upon as defined by computer executable instructions, such as program modules, that are executed by a PC. Generally, program modules include application programs, routines, objects, components, functions, data structures, etc. that perform particular tasks or implement particular abstract data types. Also, those skilled in the art will appreciate that this invention may be employed in a user input device applicable to other processing environments, such as a client device for displaying a Web page, hand-held devices, pocket personal computing devices, digital cell phones adapted to execute application programs and to wirelessly connect to a network, other microprocessor-based or programmable consumer electronic devices, multiprocessor systems, network PCs, minicomputers, mainframe computers, and the like.

With reference to FIG. 1, an exemplary system with which the present invention is usable includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that helps to transfer information between elements within PC 20 such as during start up, is stored in ROM 24. PC 20 further includes a hard disk drive 27 for reading from and writing to X a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 is one embodiment of the present invention and is preferably a mouse, although the present invention can be implemented in other types of user input devices in which at least a portion of the device is moved relative to a surface, such as a track ball, a joystick, or a stylus. Other input devices (not shown) for PC 20 may include a microphone, a game pad, a satellite dish, a scanner, or the like. These and other input/output (I/O) devices are often connected to processing unit 21 through an I1O device interface 46 that is coupled to system bus 23. The term I/O device interface is intended to encompass each interface specifically used for a serial port, a parallel port, a game port, a keyboard port, a PS/2 port, and/or a USB port. It is also contemplated that the present invention may be coupled to the PC system bus via a wireless link. A monitor 47 or other type of display device is also connected to system bus 23 via an appropriate interface, such as a video adapter 48, and is usable to display application programs, Web pages, and/or other information. The present invention is typically used for controlling a cursor, scrolling, and/or controlling other graphic objects displayed on monitor 47, in connection with operating system and/or application programs that are executed on the PC. In addition to the monitor, PCs are often coupled to other peripheral output devices (not shown), such as speakers (through a sound card or other audio interface—(not shown)) and printers.

As indicated above, the invention may be employed for use in providing input to a single machine. However, PC 20 optionally operates in a networked environment, using logical connections to one or more remote computers, such as a remote computer 49, to which the present invention can also be coupled for user input control. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and for coupling to the Internet.

When used in a LAN networking environment, PC 20 is connected to LAN 51 through a network interface or adapter 53. When used in a WAN networking environment, PC 20 typically includes a modem 54, or other means for establishing communications over WAN 52, which may include the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. The present invention is thus suitable for use in providing user controlled input to a PC or other computing devices in either a stand alone or a network configuration.

Exemplary Pointing Device

Figure 2:
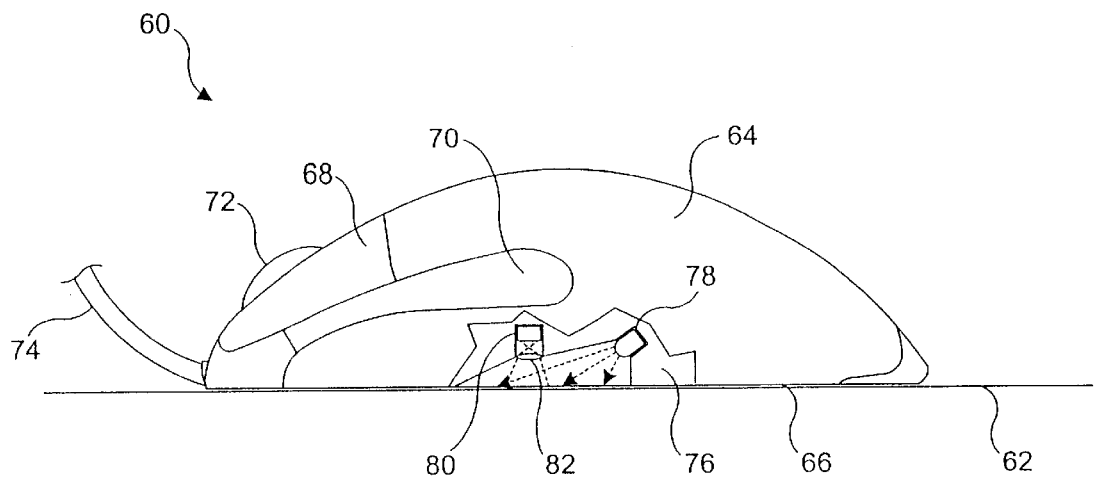
FIG. 2 is a partially cut-away side elevational view of an optical mouse that employs the present invention.

While the present invention is not limited to a pointing device, since it can be used for detecting relative movement between a user-controlled object and an adjacent surface in other devices, in its initial preferred embodiment, the present invention is used in a mouse 60. As shown in FIG. 2, mouse 60 is of the optical type that uses an optical imaging system for determining movement of the mouse over an underlying surface. Mouse 60 includes a housing 64 that is generally convex-shaped to fit within the palm of a user's hand (not shown). A mouse having the general shape and appearance as shown in FIG. 2 has been sold by Microsoft Corporation in the past, although the mouse previously sold did not include the present invention. Mouse 60 is intended to be moved by a user over an underlying surface 62, which is not required to have any specific design or features. Perhaps the only requirement for the surface is that it not be so homogenous that any portion of it appears virtually identical to any other portion. Also, it is preferable that surface 62 not include lines that extend generally parallel, such as the grain in certain wood (or artificial wood) surfaces, since for any component of the motion of the mouse directed along the grain lines, it may be difficult to detect differences in the image of the surface.

Housing 64 includes a base 66 that is red, but generally optically transparent. As shown in FIG. 2, housing 64 also includes a left-select button 68 and a right-select button (not shown) on the top of the front portion of the mouse. An additional button 70 is provided on the left side and is typically programmed to cause an Internet-browsing application to back up, i.e., to display a previous Web page. A similar button (not shown) is included on the other side of housing 64 for advancing to and displaying the next Web page (of those previously displayed in the browsing program). In addition, a user-rotatable wheel 72 is mounted in the top center at the front of housing 64 and can be rotated for scrolling within an application program or depressed to actuate another scrolling function. A cord 74 is coupled to housing 64 and includes a plurality of leads (not separately shown) that communicate signals to an I/O port of PC 20 or of another type of computing device.

As shown in FIG. 2, housing 64 is cut away to schematically illustrate a mount 76 in which are disposed a light-emitting diode (LED) 78 that emits red light directed downwardly to surface 62. The angle of incidence of the red light emitted by LED 78 onto surface 62 is relatively acute. Light from the LED is reflected by surface 62 upwardly to a pixelated image sensor 80 disposed within mount 76. The light reflected from the surface passes through a lens 82 that focuses the light on the pixelated image sensor. In this preferred embodiment, pixelated image sensor 80 is of the complementary metal oxide semiconductor (CMOS) type, configured in a 20×20 pixel array. Alternatively, a charge coupled device (CCD) array pixelated image sensor could be used. Pixelated image sensor 80 produces an output signal corresponding to an image frame of a portion of surface 62, and the image data for this frame is rapidly read from the image sensor for processing in accord with the present invention, as explained below. The speed with which this processing occurs is so great that it is possible for the present invention to track the motion of mouse 60 at speeds greater than 37 inches/sec., in contrast with a previously sold optical mouse that could only track movement of the prior art optical mouse at speeds up to 18 inches/sec.

Movement of the mouse is determined in regard to nominal X and Y axes that are relative to the orientation of the mouse (i.e., the X axis is nominally generally aligned with the width of the mouse and the Y axis is nominally generally aligned with the length of the mouse), but the orientation of these axes is user adjustable. Also in this preferred embodiment, virtually all processing required to produce an output signal indicating any $\Delta x$ and $\Delta y$ components of movement of the mouse over the surface, relative to these orthogonal X and Y axes, is carried out within the mouse. The signal conveyed through cord 74 indicates the movement of the mouse over surface 62 with a resolution of approximately 400 pixels per inch. Also, this preferred embodiment captures image frames of the surface at a rate greater than about 9000 frames/sec. An alternative embodiment, which is not shown, employs a similar mouse that is coupled to PC 20 or another type of computing device by a wireless link. It is expected that the wireless mouse will capture image frames with the pixelated image detector at a rate of about 6000 frames/sec.

Figure 3:
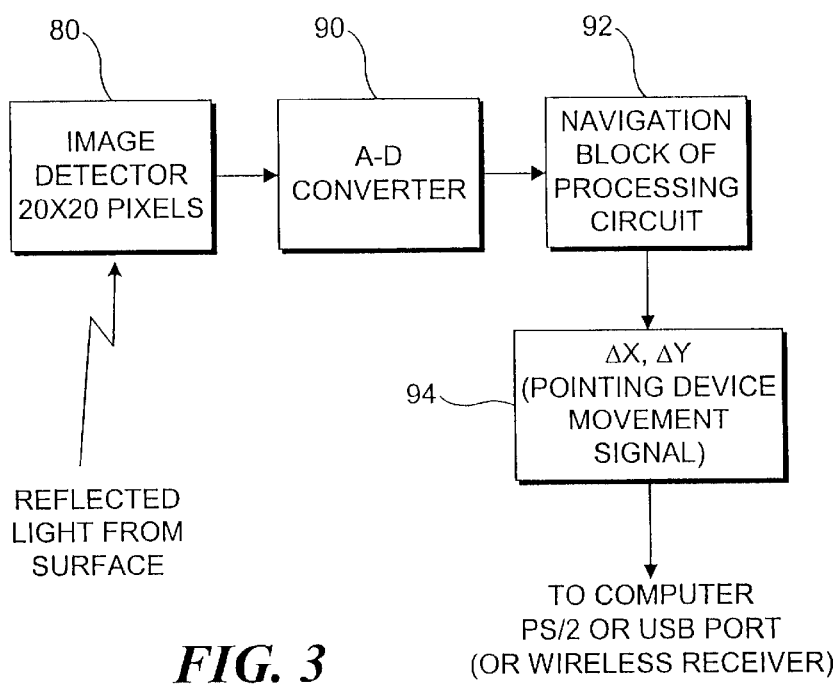
FIG. 3 is a functional block diagram that illustrates the component used within a pointing device to determine its movement relative to X and Y axes.

Referring to FIG. 3, an overall block diagram illustrates the functional blocks for determining movement to produce an output signal from mouse 60 in response to a user-controlled movement of the mouse over surface 62. The analog signal produced by the pixelated image sensor is read from the detector row by row, pixel by pixel in each row. This signal is input to an analog-to-digital (A-D) converter 90, which converts the analog signal to a corresponding digital signal with a resolution of eight bits/pixel. The value of each pixel in the 20×20 image frame can thus range between 0 and 255, corresponding to a gray scale pixel for the image frame. The light source and the image detector are controlled so that an average value for the pixels in the 20×20 image frame is equal to about 128 (i.e., one-half of a full scale of 255).

The digital signal produced by A-D converter 90 is then input to a navigation block of a processing circuit, as shown in a functional block 92. The processing circuit determines a cross correlation between each successive pixel within a correlation window of a comparison frame and a range of pixel positions around a corresponding pixel in the correlation window of a reference frame that is stored in a buffer memory. For a range of pixel positions around each pixel, the processing circuit also determines an auto correlation for successive pixels in the reference frame. Using the components of cross correlation and auto correlation that are thus determined, the processing circuit then produces an output signal indicating movement of mouse 60 relative to surface 62, corresponding to a displacement $\Delta x$ and/or $\Delta y$ along the respective orthogonal axes. As indicated in a block 94, this output signal for the pointing device indicates the relative movement and is input to a computer, such as PC 20 or to another computing device. The signal can be input through any port for which it is appropriately formatted, such as the PS/2 port or the USB port.

Figure 4:
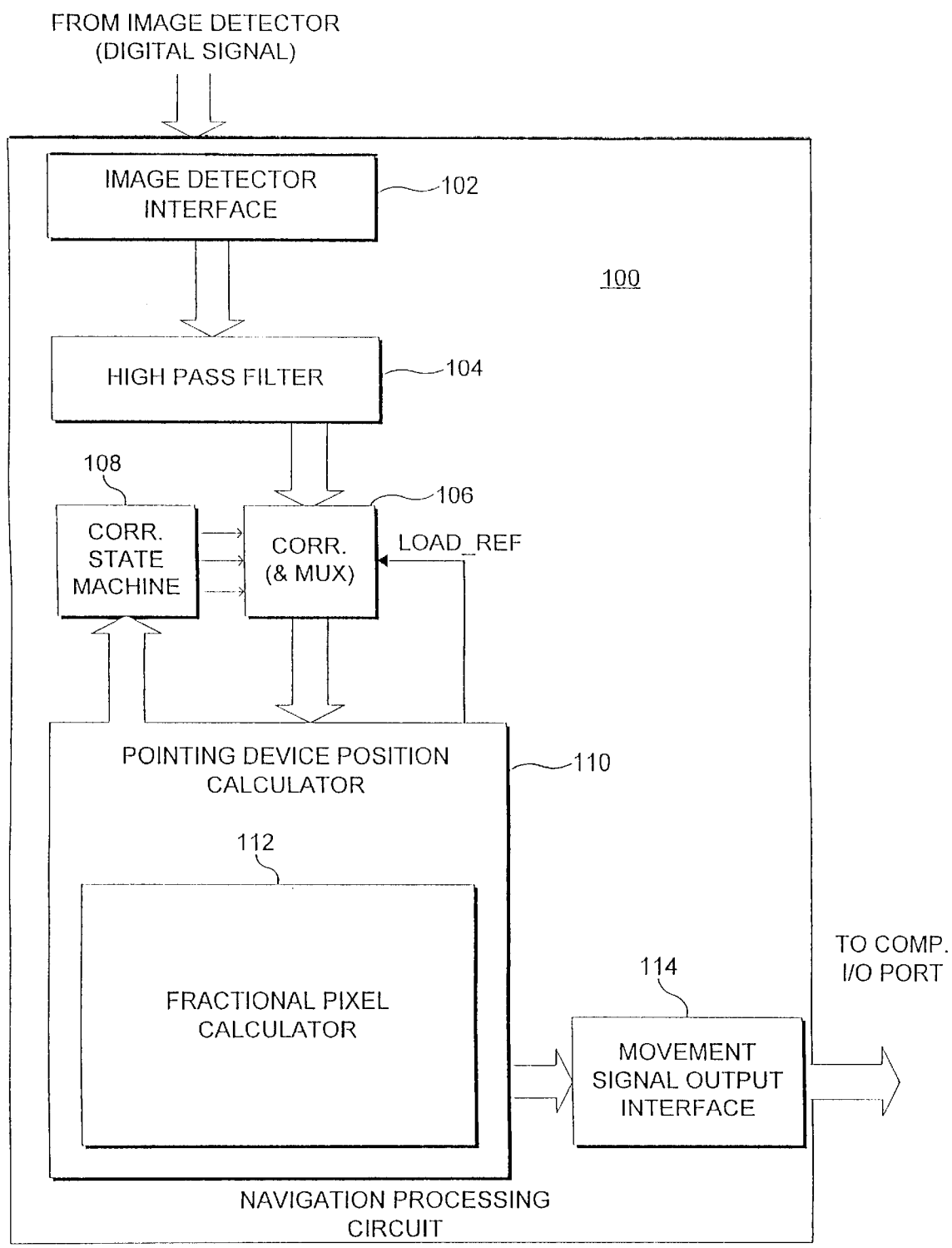
FIG. 4 is a block diagram of the electronic processing circuitry used in a pointing device in accord with one embodiment of the present invention.

Details of a navigation processing circuit 100 are illustrated in FIG. 4. This circuit receives the digital signal from A-D converter 90 (shown in FIG. 3). An image detector interface 102 handles timing considerations when reading the digital data for each pixel included in the digital signal as the image data are read from the image detector as successive pixels, row by column. The pixel data from the image frame are then processed through a high-pass filter 104, and the resulting filtered data are input to a correlator 106. Correlator 106 includes a buffer memory in which the pixel data for a reference image are loaded and temporarily stored, as explained further below, and a MUX that determines whether the previously loaded reference frame is reloaded back into the buffer memory, or pixel data for a current comparison frame are loaded into the buffer memory as a new reference frame. The state of correlator 106 is controlled by a correlator state machine 108 under the control of a pointing device position calculator 110.

The output of correlator 106 is input to pointing device position calculator 110 for use in determining the direction and extent of the relative movement between the pointing device and the adjacent surface, within the limited range of the cross correlation. Also included within pointing device position calculator 110 is a fractional pixel calculator 112 that uses auto correlation and cross correlation to determine a sub-pixel interpolation as part of the movement signal output from the navigation processing circuit. A movement signal output interface 114 that is coupled to the pointing device position calculator appropriately formats the movement signal for input to a selected type of input port on a PC. This movement signal includes any $\Delta x$ and $\Delta y$ integer and sub-pixel components. The sub-pixel component for each axis is determined by fractional pixel calculator 112. When formatted for input through a PS/2, USB, or other appropriate port of a computing device, the output signal from mouse 60 can then be used for controlling the position of a cursor or other object on a display, in response to input from a user controlling the mouse.

To avoid edge effects, image detector interface 102 strips away the first and last row and the first and last column of the 20×20 pixel image frame, providing only digital image data for the innermost 18×18 pixels of the original 20×20 pixel array to high-pass filter 104. Accordingly, only pixel data from an image frame corresponding to an 18×18 pixel array (centered within the 20×20 pixel image frame) are loaded into the buffer memory of correlator 106 for each reference frame stored.

Figure 5:
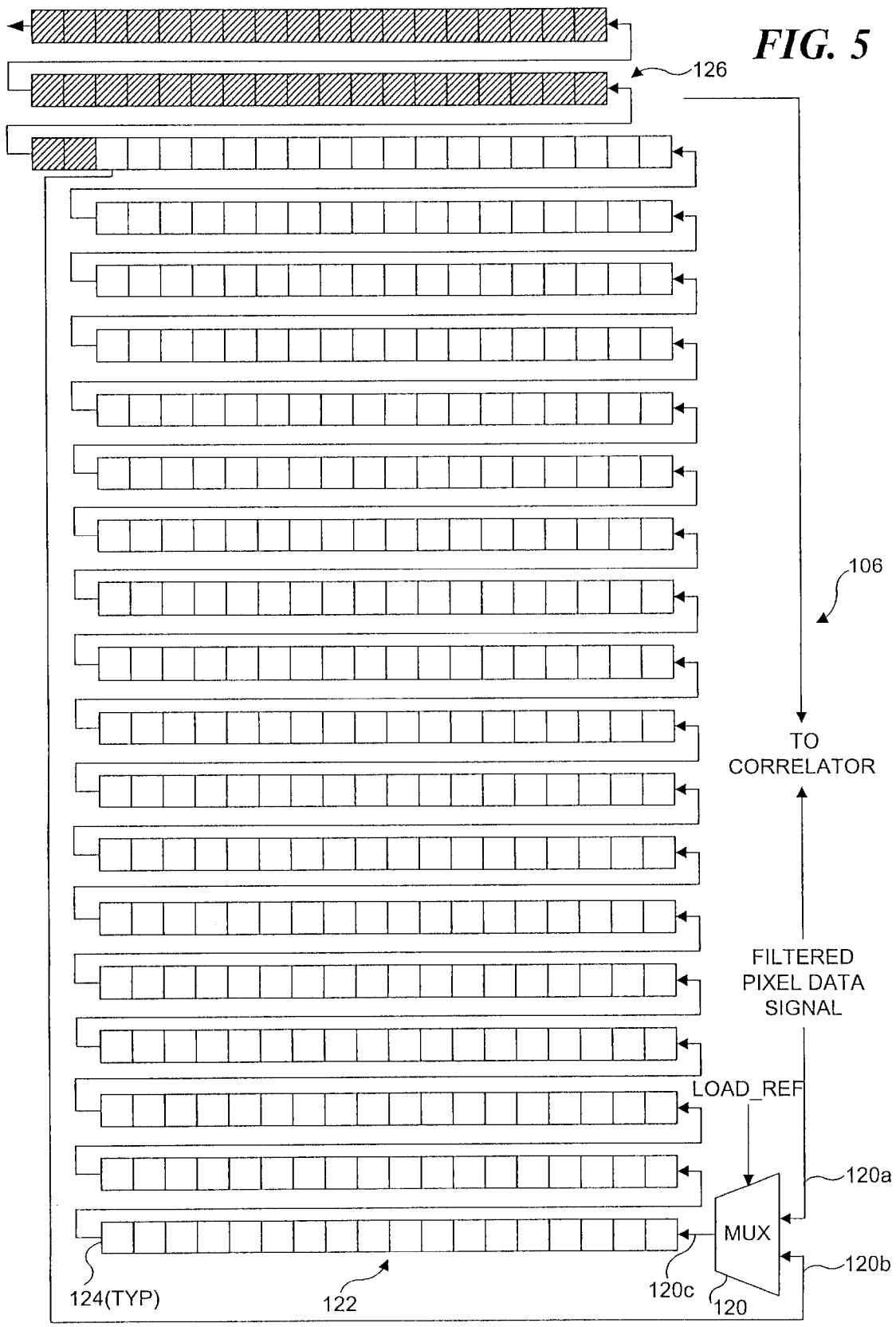
FIG. 5 is a schematic diagram of a multiplexer (MUX) coupled to a memory buffer that is loaded with image data for a reference frame of a surface for use in calculating auto correlation and for determining cross correlation relative to successive pixels of image data from a comparison frame of the surface.

In FIG. 5, details of a buffer memory 122 are illustrated. Buffer memory 122 receives successive pixel data from a MUX 120 having a first input 120a and a second input 120b that selectively are enabled to provide the pixel image data to buffer memory 120 through an output 120c of the MUX.

The reference frame previously stored in the buffer memory are reloaded into the buffer memory in response to a LOAD_REF signal provided by correlator state machine 108 (FIG. 4). Alternatively, the pixel data for the current comparison frame are loaded into the buffer memory for use as a new reference frame. MUX 120 thus serves as an electronic switch to determine whether the pixel data previously stored within buffer memory 122 are reloaded, which is the normal case, or whether a new reference frame is loaded using the filtered pixel data signal for the current comparison frame.

A key benefit of the present invention relates to its ability to determine movement based on cross correlation that is computed using the pixel data for the reference frame stored in the buffer memory, and pixel data for a comparison frame, which need not be stored in a memory array. Data for successive pixels of the comparison frame are input to the pointing device position calculator for use in connection with appropriate corresponding data for the pixels stored within buffer memory 122 for the reference frame. The stored data for the reference frame and the incoming data for the comparison frame are then used to calculate components of the cross correlation for each of a plurality of different components related to possible directions of movement.

In this preferred embodiment, cross correlation is determined only for a specific 12×12 pixel portion (i.e., a correlation window) of the total 18×18 pixel array for both the reference frame and the comparison frame. The specific 12×12 pixel portions of the 18×18 pixel reference and comparison frames that are used in the cross correlation determination correspond to the pixels within the 12×12 correlation window location in each image frame. Details concerning the manner in which the location of the 12×12 correlation window is determined within the reference frame and within the comparison frame are explained below.

As the data for each pixel of the 12×12 correlation window in the comparison frame are read one pixel at a time from the pixelated image sensor, the components of the cross correlation array that use that data are calculated by determining the absolute value of the differences between the data for that comparison frame pixel and the relevant data in the correlation window of the reference frame. It is the processing of the comparison frame pixel data one pixel at a time in the present invention that enables cross correlation to be determined without the need for storing the comparison frame in a separate memory buffer.

In addition to determining cross correlation, the correlator also determines auto correlation for each pixel within the correlation window of the reference frame. It should be noted that unless a new reference frame is loaded into buffer memory 122, the auto correlation components of the reference frame will not change. Nevertheless, in this embodiment, auto correlation is recalculated each time that cross correlation is determined, regardless of whether a new reference frame has been loaded into buffer memory 122. Also, auto correlation is determined in regard to a 3×3 array of pixels surrounding the pixel currently being processed in the reference frame, resulting in a total of nine components for auto correlation. However, since the auto correlation component for the central position in the 3×3 array is always equal to zero, there is no need to calculate it, and thus, only eight auto correlation components need be computed. Further details relating to determination of auto correlation and to disposition of components of the auto correlation are discussed below.

In addition to including 18 rows 124 of data for each of 18 different pixels, buffer memory 122 also includes 38 temporary storage locations 126 through which data for a previous reference frame are shifted and stored for use in determining cross correlation as a new reference frame is loaded into the buffer memory. It should be apparent that as the last two rows of data for pixels in a new reference frame are being loaded into buffer memory 122, in order to calculate cross correlation using data for the previous reference frame, temporary storage 126 is required to store the data for the pixels of the last two rows of the previous reference frame. As the data for the new reference frame are loaded into buffer memory 122, the data for each pixel position are shifted to the left until upon reaching the far left end of a row in FIG. 5 (at least in regards to the illustrated example), the data are then shifted to the far right end of the next higher row within the buffer memory. Similarly, data for pixels in the 18×18 pixel array of buffer memory 122 are shifted through temporary storage 126 a pixel at a time, so that as the data for the new reference frame approaches the upper left corner of the 18×18 array, the data for the last 38 pixels of the old reference frame are being shifted into temporary storage 126. Accordingly, the data for the previous reference frame is thus available for calculation of correlation in regard to the last row of the comparison frame currently being loaded in as the new reference frame in buffer memory 122.

Buffer memory 122 has certain unique characteristics that are in some ways similar to a shift register since the data for each successive pixel is shifted through the buffer memory generally in the same manner as through a shift register. However, the provision for temporary storage 126 and the ability to read data from selected portions of the buffer memory for use in calculating cross and auto correlation are unique to the design of buffer memory 122.

Figure 6:
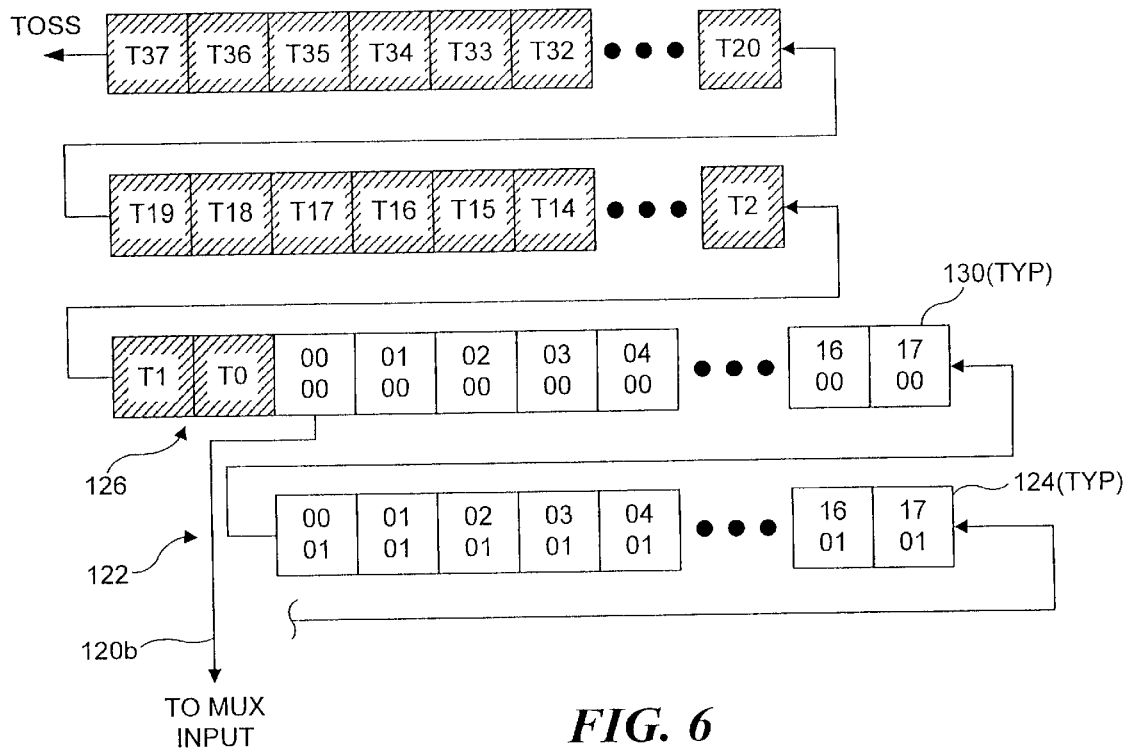
FIG. 6 is an expanded view of a portion of the buffer memory and temporary storage of FIG. 5.

FIG. 6 illustrates details of the upper two rows of buffer memory 122 and of temporary storage 126. When a new reference frame has been completely loaded into buffer memory 122, the x, y coordinates of each cell 130 within each row 124 in the 18×18 pixel array are generally as indicated in this FIGURE. When the reference frame is fully loaded into the buffer memory, a pixel having x and y positions 0, 0 will be disposed in the upper left corner of buffer memory 122, adjacent to a temporary cell labeled T0 in temporary storage 126. As the first pixel data for the next comparison frame are then loaded into the correlator, the image data for pixel 0, 0 will then normally be input back to second MUX input 120b, for use in reloading buffer memory 122 with the data for current reference frame. This reloading of the previous reference frame data will not happen if sufficient movement has occurred, so that it becomes necessary to load a new reference frame into buffer memory 122. A new reference frame must be loaded to avoid a situation in which there is insufficient overlap between the comparison frame next to be input and the current reference frame.

It should be evident that as a user moves a pointing device over a surface, the velocity of that movement can be used to predict when the next comparison frame to be read will no longer overlap with a current reference frame so that it will be necessary to load a new comparison frame into buffer memory 122 as the new reference frame. When it is necessary to load a new reference frame, MUX 120 selects first input 120a instead of second input 120b to load the current comparison frame into the buffer memory. In any case, data for each pixel of the current reference frame are shifted into temporary storage 126 and after being shifted through the 38 positions of this temporary storage section, the data are simply "tossed."

Figure 7:
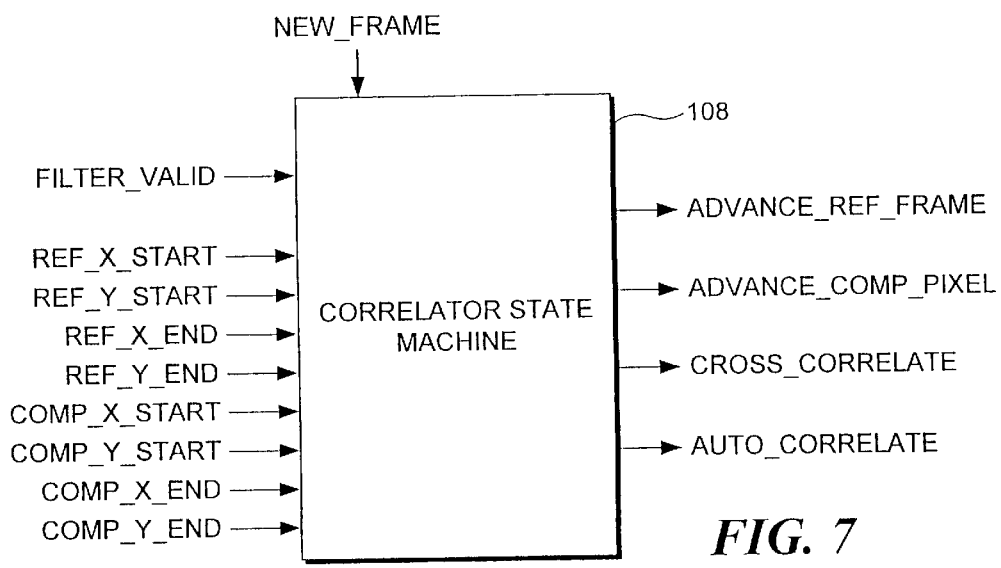
FIG. 7 is a block diagram showing a correlator state machine and the signals input and output therefrom.

FIG. 7 illustrates the various signals that are input to and output from correlator state machine 108. The inputs to correlator state machine 108 are provided by pointing device position calculator 110 (see FIG. 4) in regard to the input signals. FILTER_VALID is an input signal indicating whether the output from the high-pass filter into the correlator are valid data for a pixel position of the current image frame. The input signals REF_X_START and REF_Y_START respectively, refer to the x and y start addresses within buffer memory 122 for the current correlator window. Similarly, REF_X_END and REF_Y_END respectively refer to the end addresses for the correlator window in the reference frame. The last four input signals are the x and y start and x and y end addresses for the comparison frame currently being processed. Another input signal, NEW_FRAME, indicates to the correlator state machine that the next comparison frame has been imaged and is available for input, a pixel at a time, for determination of the cross correlation with the reference frame stored in the buffer memory.

Control of the buffer memory, causing it to shift the data for each pixel to the next position, is provided by an ADVANCE_REF_FRAME signal output by correlator state machine 108. Similarly, a signal ADVANCE_COMP_PIXEL is applied to the image detector interface to enable input of the data for the next pixel in the comparison frame. The calculation of cross correlation and auto correlation is initiated by CROSS_CORRELATE and AUTO_CORRELATE signals, respectively, which are output by the correlator state machine.

Figure 8A:
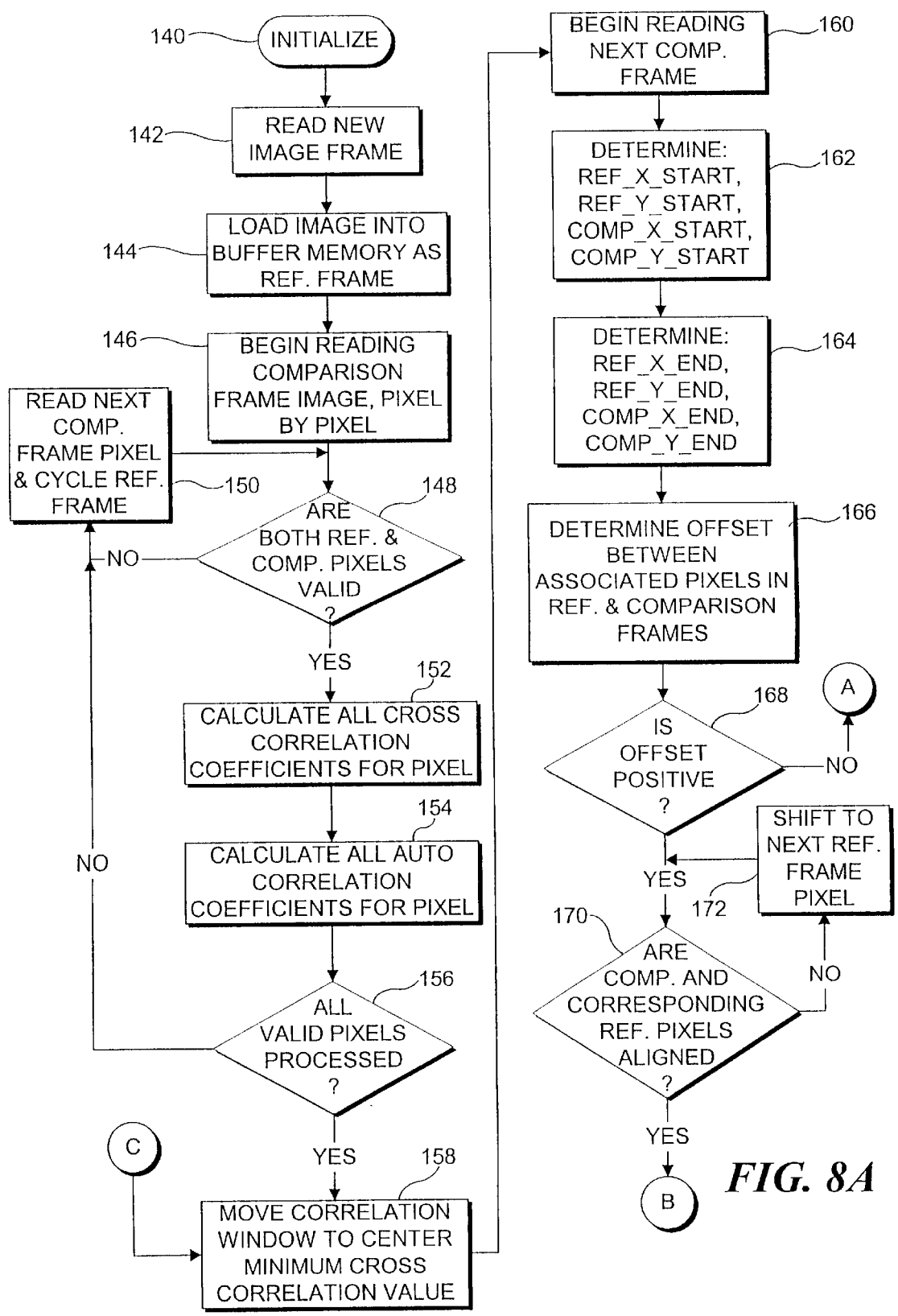
FIGS. 8A and 8B are a flow chart showing the logic implemented in the present invention for determining the relative movement between a pointing device and an adjacent surface.
Figure 8B:
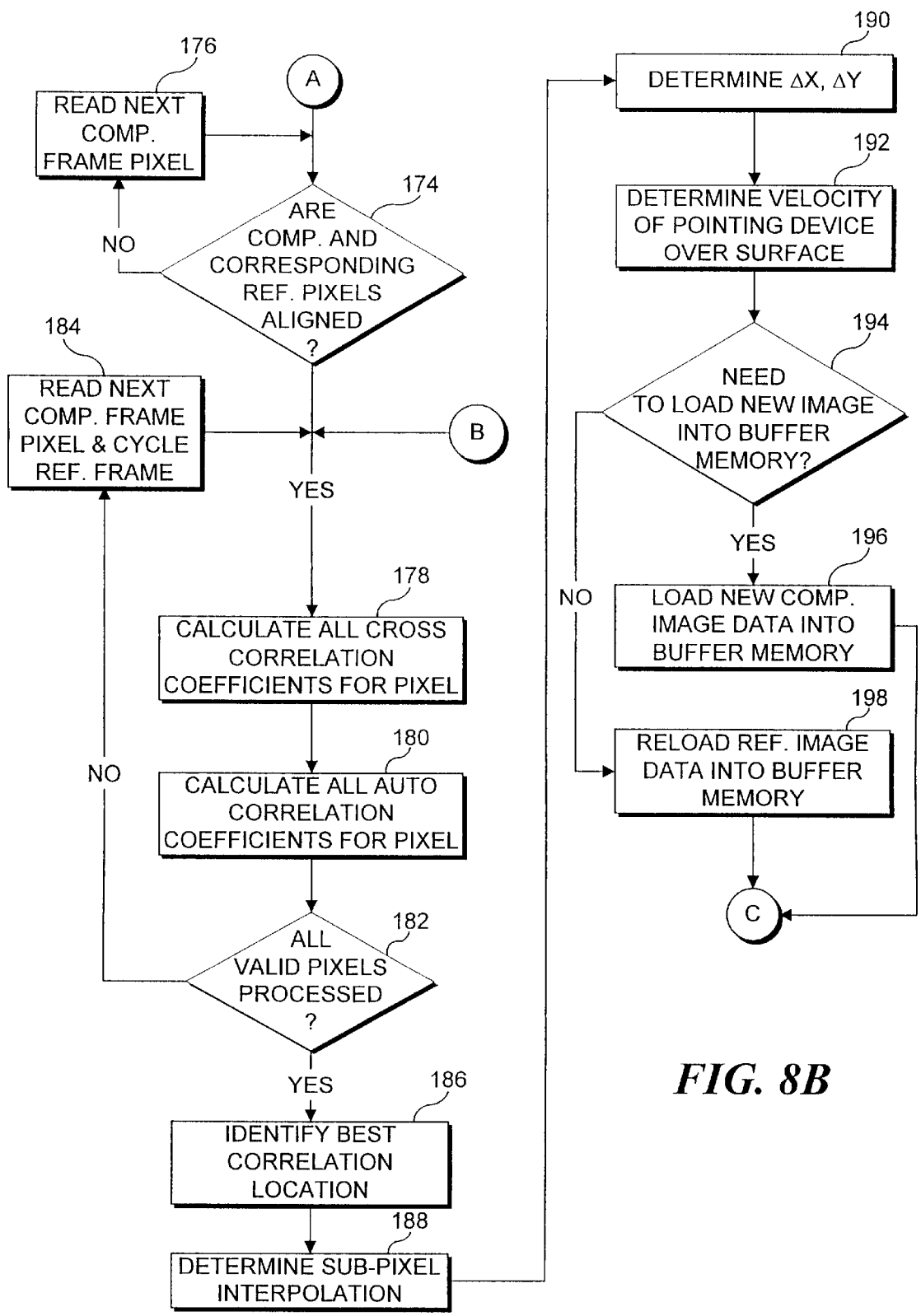

FIGS. 8A and 8B illustrate the steps implemented in the present invention for determining relative movement between the pointing device and its adjacent surface based upon the calculation of cross correlation and auto correlation. In a step 140, for example, upon initial boot-up of the pointing device, all required registers are initialized. Next, the logic provides for reading a new image frame in a block 142, using data conveyed by the output signal from the pixelated image sensor. Since a reference frame will not initially be available in the buffer memory, a block 144 provides for loading the image data into the buffer memory. After this initial reference frame is loaded, the next image frame read is a comparison frame image, and its data are processed pixel by pixel, as provided in a step 146. A decision block 148 determines if both the current reference and comparison frame pixels are valid. This determination is affirmative if the current pixel is within the correlation window, which is a specific 12×12 pixel portion of the 18×18 pixel comparison frame and 18×18 pixel reference frame. Initially, the correlation window is centered in each of the reference and comparison frames. If not a valid pixel, the next comparison frame pixel is read and pixels for the reference frame are cycled by shifting them to their next position so that the corresponding next reference frame pixel is used in a step 150. The test at decision step 148 is then repeated.

Initially, as noted above, the correlation window is centered within both the comparison frame and the reference frame, i.e., with a three-column and three-row margin around each side of the correlation window in the 18×18 pixel array portions of each of these two frames. (Note that a margin of at least two rows and two columns surrounds the correlation window in the reference frame and comparison frame.)

In a step 152, the correlator calculates all of the cross correlation coefficients for the current pixel being processed. As noted above, there are normally nine cross correlation coefficients for a pixel. However, under certain circumstances, the size of the correlation array is increased from 3×3 to 5×5, to provide for a total of 25 cross correlation coefficients. The reasons for increasing the size of the cross correlation array are discussed below; however, it is only under unusual circumstances that it becomes necessary to increase the size of the cross correlation array in this manner. Following the calculation of the nine cross correlation coefficients (or 25 coefficients when necessary), a step 154 provides for calculating all of the eight auto correlation coefficients for the current pixel in the reference frame. Next, a decision step 156 determines if all of the valid pixels in the correlation window have been processed, and if not, the logic loops back to step 150.

After all of the valid pixels for the current comparison frame have been processed, step 158 provides for determining the correlation window positions for both the reference frame and the next comparison frame to be processed. Details of the logic applied in implementing step 158 are discussed below.

At a step 160, the correlator begins reading the next comparison frame, a pixel at a time. Based upon the correlation window positions in the reference frame and comparison frame that is now being read, a step 162 provides for determining the x and y start positions within the 324 pixels positions for each of the reference and comparison frames. Similarly, in a step 164, the x and y end positions for the 12×12 correlation window are determined. Based upon the relative start positions, the offset is determined between the associated pixels of the reference frame and comparison frame in a step 166. The start and end positions within the reference frame can differ (be offset) from those in the comparison frame by as much as two rows and two columns, for the respective 18×18 image arrays.

A decision step 168 determines if the offset that was determined is positive, and if so, the logic proceeds to a decision step 170 that determines if the comparison and corresponding reference pixels are aligned. This step actually determines if the appropriate comparison and reference frame pixels are being used for purposes of determining cross correlation. If not, a step 172 provides for shifting to the next reference frame pixel before repeating the determination in decision step 170. Once the reference and comparison frame pixels are aligned, the logic proceeds to a step 178 in FIG. 8B.

If the result in decision step 168 indicates that the offset is negative, the logic proceeds to a decision step 174 in FIG. 8B. This step again determines if the comparison and corresponding reference pixels are aligned, and if not, a step 176 provides for reading the next comparison frame pixel. In this manner, the logic ensures that corresponding reference and comparison frame pixels within the correlation window are used for computing cross correlation. Following the determination in either decision step 170 or 174, step 178 calculates all of the cross correlation coefficients or components for the current pixel. Similarly, a step 180 provides for calculating all of the auto correlation coefficients or components for the current pixel in the reference frame. A decision step 182 determines if all of the valid pixels have been processed and if not, a step 184 reads the next comparison frame pixel and cycles the reference frame so that all of the positions for the reference frame data are shifted by one position. Step 178 then repeats.

After processing all of the valid pixels, a step 186 identifies the location of the maximum correlation pixel among the nine components for cross correlation (or on those occasions when necessary, among the 25 components).

The position of the maximum correlation indicates the direction in which movement has occurred between the relative position of the reference frame and that of the comparison frame. Accordingly, it is possible for movement to have occurred in any of the eight possible directions, or alternatively, for no movement to have occurred, in which case the maximum correlation will be in the center position of the correlation array.

A step 188 then determines a sub-pixel interpolation based on auto correlation (and cross correlation) component. The combination of the direction in which maximum correlation occurred and the sub-pixel interpolation determines the component for $\Delta x$ and $\Delta y$ in block 190 that will be output from the navigation processing circuit for use by the computing device to which the pointing device is connected. A block 192 also provides for determining the velocity of the pointing device over a surface as a function of the accumulated motion in a given direction over a defined time. Based upon the velocity, a determination is made as to whether it is necessary to load a new reference frame into the buffer memory using the next comparison image that is processed. This determination ensures that sufficient overlap will be provided between a subsequent comparison frame and the reference frame in order to determine the direction of movement of the pointing device relative to the adjacent surface. If it is necessary to load the next comparison frame into the buffer memory for use as a new reference frame, a step 196 provides the signal to MUX 120 to cause it to do so. Otherwise, from decision step 194, a step 198 begins reloading the reference image data into the buffer memory for use in again determining the movement of the pointing device relative to the adjacent surface. The logic then returns to step 158 in FIG. 8A, to determine the correlation window positions in both the reference frame and the correlation frame.

Figure 9A:
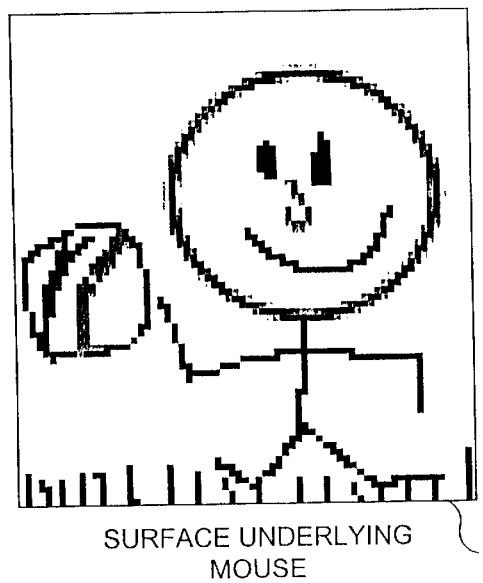
FIG. 9A illustrates a portion of a surface.
Figure 9B:
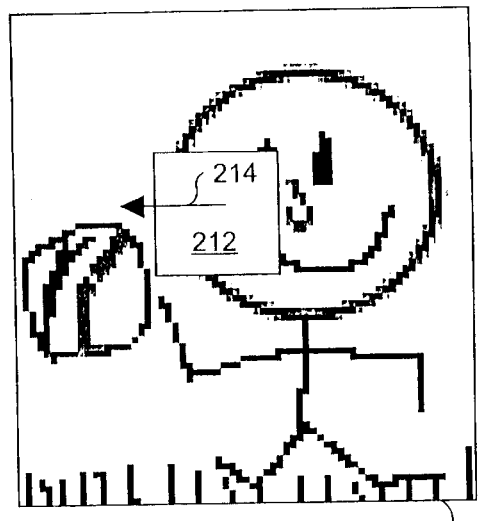
FIG. 9B illustrates the portion of the surface shown in FIG. 9A and indicates an image frame that is captured as an optical mouse is moved over the surface at a rate of about 2 pixels/frame.

Step 158, which provides for determining the correlation window position, is easier to understand in regard to a simple graphic example. In FIGS. 9A and 9B, a graphic image 210 represents the surface-underlying mouse 60. A 20×20 image of a portion of graphic image 210 occupies a region 212 and corresponds to the image detected by the image sensor in the mouse. Region 212 moves to the left over graphic image 210 as the mouse is moved in that direction, as indicated by an arrow 214 in FIG. 9B.

Figure 10:
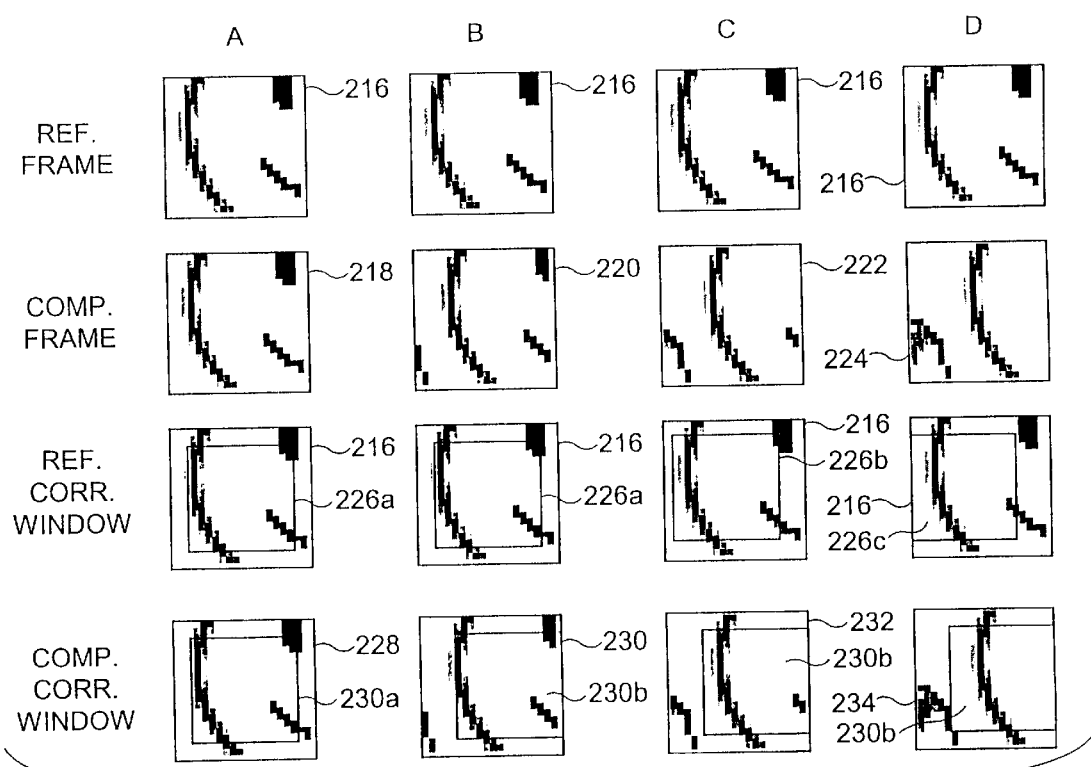
FIG. 10 illustrates a reference frame, a comparison frame, the disposition of a correlation window in the reference frame, and the disposition of a correlation window in the comparison frame, for each of four successive comparison frames as the mouse is moved over the surface shown in FIG. 9B.

The logic applied in determining the position of the correlation window in the reference and comparison frames is illustrated in regard to the portion of graphic image 210 imaged by the image sensor in mouse 60 as the mouse is moved over the graphic image. A first row of FIG. 10 illustrates a reference frame 216, comprising 18×18 pixels of region 212. Reference frame 216 includes a left side of a face of a stick figure comprising graphic image 210. Initially, a comparison frame 218 in column A of FIG. 10 includes the same pixel data as reference frame 216. However, as the mouse is moved toward the left, an 18×18 pixel comparison frame 220 shown in column B is shifted slightly to the left, so that it includes slightly more of the image of the underlying surface to the left of comparison frame 218, and slightly less of the underlying image on the right of comparison frame 218. Further changes in the portion of graphic image 210 included within comparison frames 222 and 224, in columns C and D, occurs as the mouse is moved further to the left over the graphic image.

Initially, in column A, a correlation window 226a is disposed within a central portion of reference frame 216, and comprises the innermost 12×12 pixel region centered within the 18×18 pixel reference frame. Similarly, in column A, a correlation window 230a within comparison frame 218 is also centered as a 12×12 pixel array within 18×18 pixel comparison frame 218. However, in column B, as a result of the movement of mouse 60 toward the left, a correlation window 230b is now shifted toward the right margin of comparison frame 220 so that the portion of the image in the 12×12 pixel comparison correlation window generally matches that in the 12×12 reference correlation window in column B.

Under column C, as further motion of the mouse to the left occurs, a reference correlation window 226b is shown shifted slightly to the left, relative to reference correlation window 226a. The shift of the reference correlation window in this manner thus causes a relatively close match between the portion of the graphic image in reference correlation window 226b and that in comparison correlation window 230b. In the final column of this example, a reference correlation window 226c is shifted to the far left margin of reference frame 216, maintaining a relatively close match between portion of the graphic image in reference correlation window 226c and that in comparison correlation window 230b.

From the preceding graphic example, it will be apparent that based upon a previous determination of the cross correlation and the related movement, the relative position of the correlation window is shifted in at least one of the reference and comparison frames to maximize the portion of the image that appears within the correlation window of both the reference and comparison frames, for determination of subsequent movement as the next comparison frame is processed, pixel by pixel. The change in the position of the correlation window in each frame is determined based upon the movement of the pointing device just determined using the last cross correlation.

It is somewhat easier to understand the relationship between the 18×18 pixel reference frame (or comparison frame) and the position of the correlation window by referring to FIG. 11. As shown in this Figure, an 18×18 reference frame 240 includes long dashes 242 that define the limit of the possible location of a 12×12 correlation window 244 within the reference frame. In the example shown in FIG. 11, correlation window 244 has been shifted to the upper margin and left margin of the limit line. A similar relationship exists within the 18×18 pixel comparison frame in regard to the possible positions of the 12×12 correlation window. Accordingly, to the extent possible, changes in the position of the 12×12 correlation window in one or both of the reference frame and comparison frame are made within these limits to maximize the extent of overlap between the portion of the reference frame to which each subsequent comparison frame is to be compared. The disposition of the correlation window within the reference frame and comparison frame is determined by the position of the pixel of maximum correlation to the reference frame, for the previous comparison frame. When the velocity of the pointing device over the surface indicates that a new reference frame should be loaded, the previous determination of movement still can be used to determine the relative location of the 12×12 correlation window in the new reference frame and in the subsequent comparison frames.

FIG. 11 also illustrates a 3×3 array 246 of pixel positions relative to a pixel position 248 indicated by "P" at the upper left corner of 12×12 correlation window 244. The 3×3 pixel array around position 248 indicates the nine components for cross correlation and thus indicate the possible directions of movement of the pointing device relative to the underlying surface. As subsequent pixel data are shifted into position 248, further determinations of the components of the nine coefficients for cross correlation are added to the previous determinations for the 144 pixels in the correlation window. Similarly, in the reference frame, auto correlation is determined for each of the 144 pixels comprising the 12×12 correlation window. The cross correlation is used to determine a direction of maximum correlation (which corresponds to the position or direction of minimum difference between related pixels in the comparison frame and reference frame). The maximum correlation position in the cross correlation array thus indicates the direction of movement. A maximum correlation at the center position indicates that substantially no movement has occurred.

In the event that the quality of the surface or other conditions causes the maximum difference for the nine components of the cross correlation between the reference frame and the comparison frame to fall below a predefined minimum, the logic will determine that the current cross correlation cannot be relied upon to determine movement of the pointing device relative to the surface. Accordingly, for the next comparison frame, 25 coefficients will be determined for each of the 144 pixels in the comparison frame. These 25 positions are enclosed by a dotted line 250 in FIG. 11. The 5×5 cross correlation array can determine relative movement by as much as two pixels in either the positive or negative x direction and/or two pixels in either the positive or negative y direction. Thereafter, the cross correlation is made again with a 3×3 array of coefficients to determine a direction of movement within a −1 to +1 value for the x direction and a −1 to +1 value for the y direction.

FIG. 12A illustrates the nomenclature used in connection with determining auto correlation relative to a pixel $P_{0,0}$ at a position 262 in the center of a 3×3 pixel array 260. In regard to the equation provided below, the value of the variable a can range from −1 to 1, and the value of the variable b can range from −1 to 1, therefore providing auto correlation on the basis of nine positions from $P_{-1,-1}$ through $P_{1,1}$ as indicated in FIG. 12A. The auto correlation in this case is relative to position 262 for each of the eight positions 264 surrounding position 262. Since the auto correlation for a pixel position relative to itself is always 1, it is not necessary to calculate the auto correlation component for position 262.

FIG. 12B graphically illustrates the disposition of four different quadrants. One of these quadrant is selected based upon the direction in which relative movement between the pointing device and the surface last occurred, and the relative movement is determined from the cross correlation, as explained above. Depending upon the position (surrounding a center position 280) in which the best correlation (minimum difference) was found for the auto correlation determination, one of four quadrants, 0, 1, 2, or 3, as represented respectively by dotted lines 272, short dash lines 274, dash-dot lines 276, and dash lines 278, will be identified. The quadrant in which the maximum auto correlation was computed thus determines which of four different equations is used in calculating a sub-pixel interpolation component assigned $\Delta x$ and $\Delta y$ for the movement signal. Details of the equations for computing cross correlation and auto correlation are set forth below.

Equations for Determining Cross and Auto Correlations

The general equation for computing cross correlation between a comparison frame and a reference frame in regard to a and b components is given by:

$$\text{cross correlation}(a, b) = \sum_{y=0}^{N} \sum_{x=0}^{M} |\text{comparison}(x, y) - \text{reference}(x + a, y + b)|$$

where, normally in this preferred embodiment, $-1 \leq a \leq 1$, $-1 \leq b \leq 1$, and thus, there are a total of 9 cross correlation components for each frame. Both N and M are equal to 11 in the preferred embodiment.

If, due to the generally uniform nature of the surface over which the pointing device is moving, the minimum cross correlation component computed for the current comparison frame is less than a predefined threshold, the result cannot be relied upon and will be discarded. For example, a surface area having a generally uniform gray scale value, and a generally homogeneous texture might well produce a resulting cross correlation that fails to accurately indicate movement. If such a result is obtained for the cross correlation, an alternative 5×5 cross correlation array with 25 cross correlation components is determined to find a correlation minima that is used to better align the correlation window with the comparison and reference frames. Using the information from this larger cross correlation array, the position of the correlation window can better be determined; however, for the next comparison frame, the logic again will revert to using a 3×3 cross correlation array, with nine cross correlation components.

The general equation for computing auto correlation components for the pixels of a reference frame is similar to the equation for determining cross correlation and is as follows:

$$\text{auto correlation}(a, b) = \sum_{y=0}^{N} \sum_{x=0}^{M} |\text{reference}(x, y) - \text{reference}(x + a, y + b)|$$

where, in the embodiment preferably used, $-1 \leq a \leq 1$, $-1 \leq b \leq 1$, so that there are a total of 9 auto correlation components for each frame. Again, both N and M are equal to 11. The auto correlation component for the case where both a and b equal 0 is always equal to one, so only eight auto correlation components need be computed for each pixel in correlation window.

For determining sub-pixel interpolation, which provides better resolution in specifying the $\Delta x$ and $\Delta y$ signal indicative of the relative movement of the pointing device over surface, both auto correlation and cross correlation values are employed, in a two-step process. First, variables that characterize a shape of an auto correlation curve (generally concave or bowl shaped) are determined as follows:

$B11 = 3/2*[(AC3+AC7)-(AC1+AC9)]$ $B20 = 2*[(AC4+AC1+AC7+AC3+AC6+AC9)]$ $B02 = 2*[(AC1+AC2+AC3+AC9+AC8+AC7)]$ $DENOM = [B20*B02 - B11*B11]$ where AC1 through AC9 correspond to the auto correlation coefficients determined as noted above. The nine auto correlation components, AC1 through AC9, determined for the 144 pixel positions in the correlation window of a frame are numbered from AC1 in the upper left to AC9 in the lower right, consistent with the identifying numbers in the corners of 3×3 array 260, which is shown in FIG. 12A. Next, a MINIMUM_QUAD_LOCATION is determined, based upon the quadrant of the auto correlation array in which the smallest auto correlation component is found, as shown in FIG. 12B. All four of these quadrants overlap on the center auto correlation value, position 280, which corresponds to auto correlation coefficient AC5. The sub pixel interpolation values for $\Delta x$ and $\Delta y$ are determined based on the minimum cross correlation value and as a function of the quadrant (0, 1, 2, or 3) in which the minimum cross correlation difference value was found, using the auto correlation parameters computed above and using selected cross correlation values, with one set of the following equations:

Quadrant 0

$\text{sub\_pix\_}x = -\frac{1}{2} + 2*[(B02-B11)*(C1-C5)+(B02+B11)*(C4-C1)]$ IDENOM $\text{sub\_pix\_}y = -\frac{1}{2} + 2*[(B20-B11)*(C1-C5)+(B20+B11)*(C4-C1)]$ IDENOM Quadrant 1

$\text{sub\_pix\_}x = \frac{1}{2} - 2*[(B02-B11)*(C3-C5)+(B02+B11)*(C6-C2)]$ IDENOM $\text{sub\_pix\_}y = -\frac{1}{2} + 2*[(B20-B11)*(C3-C5)+(B20+B11)*(C6-C2)]$ IDENOM Quadrant 2

$\text{sub}_{pix}\_x = \frac{1}{2} - 2*[(B02-B11)*(C9-C5)+(B02+B11)*(C6-C8)]$ IDENOM $\text{sub\_pix\_}y = \frac{1}{2} - 2*[(B20-B11)*(C9-C5)+(B20+B11)*(C6-C8)]$ IDENOM Quadrant 3

$\text{sub\_pix\_}x = -\frac{1}{2} + 2*[(B02-B11)*(C7-C5)+(B02+B11)*(C4-C8)]$ IDENOM $\text{sub\_pix\_}y = \frac{1}{2} - 2*[(B20-B11)*(C7-C5)+(B20+B11)*(C4-C8)]$ IDENOM where the C1 through C9 components for the cross correlation are also in the indicated array positions identified by the numbers in the corners of the array elements shown in FIG. 12A.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A pointing device that produces an output signal indicative of a relative movement between at least a portion of the pointing device and an adjacent surface, comprising:

(a) an imaging detector that produces a signal corresponding to an image of the adjacent surface;

(b) an electronic switch having a first input to receive the signal from the imaging detector, and a second input, said switch being operative to selectively couple one of the first input and the second input to an output;

(c) a sequential memory buffer having an input through which data are input for storage and an output through which data are transferred out of the sequential memory buffer, said input of the sequential memory buffer being coupled to the output of the electronic switch and said output of the sequential memory buffer being coupled to the second input of the electronic switch so that said input of the sequential memory buffer selectively receives data conveyed by either the signal from the imaging detector or the output of the sequential memory buffer, depending upon a state of the electronic switch; and (d) a processing circuit that is coupled to the imaging detector to respond to the signal corresponding to the image, to the sequential memory buffer to selectively read data stored therein, and to the electronic switch, said processing circuit carrying out a logical process that:

(i) selectively controls a state of the electronic switch to selectively load the sequential memory buffer with data derived from the signal produced by the imaging detector in a first state and with data from the output of the sequential memory buffer in a second state;

(ii) uses the data in the sequential memory buffer for a reference frame and the signal from the imaging detector that comprises a comparison frame to calculate a cross correlation between the reference frame and the comparison frame; and (iii) produces the output signal indicative of the relative movement between at least the portion of the pointing device and the adjacent surface as a function of the cross correlation.

2. The pointing device of claim 1, wherein the processing circuit further uses the data for the reference frame in the sequential memory buffer to calculate an auto correlation.

3. The pointing device of claim 2, wherein the processing circuit determines a sub-pixel interpolation for the relative movement between at least the portion of the pointing device and the adjacent surface as a function of the auto correlation.

4. The pointing device of claim 1, wherein the sequential memory buffer shifts data for pixels between successive storage locations contained in the sequential memory buffer as data from the output of the electronic switch are applied to the input of the sequential memory buffer.

5. The pointing device of claim 1, further comprising a high-pass filter that is applied to the signal produced by the imaging detector, an output of the high-pass filter being coupled to the first input of the electronic switch and to the processing circuit.

6. The pointing device of claim 1, wherein the electronic switch comprises a multiplexer that determines whether a new reference frame is loaded into the sequential memory buffer or whether the reference frame previously stored in the sequential memory buffer is reloaded therein.

7. The pointing device of claim 1, wherein the data stored in the sequential memory buffer are at least partly selectively addressable and accessible by the processing circuit on a pixel-by-pixel basis.

8. The pointing device of claim 7, wherein as the processing circuit selectively controls the electronic switch to store each pixel of a comparison frame in the sequential memory buffer as a new reference frame, the data for each pixel of said comparison frame are also employed by the processing circuit in calculating a portion of the cross correlation using the data stored in the sequential memory buffer for a previous reference frame.

9. The pointing device of claim 8, wherein the processing circuit employs data for a pixel of the reference frame in calculating a portion of the cross correlation and then transfers the data either out of the sequential memory buffer so that the data are no longer used, or transfers the data back into the input of the sequential memory buffer through the electronic switch, depending, upon the state of the electronic switch.

10. The pointing device of claim 1, wherein the reference frame stored in the sequential memory buffer is replaced with a new reference frame comprising a current comparison frame as a function of a relative velocity between the pointing device and the adjacent surface, said velocity be determinative of whether a meaningful cross correlation can be determined from successive comparison frames.

11. The pointing device of claim 10, wherein the reference frame stored in the sequential memory buffer is replaced before relative movement between the pointing device and the adjacent surface is sufficient to eliminate an overlap between the reference frame that was stored in the sequential memory buffer and a current comparison frame being input from the imaging detector, the overlap being necessary to determine the cross correlation between the reference frame stored in the sequential memory buffer and the comparison frame currently being input to the processing circuit.

12. The pointing device of claim 1, wherein a data storage capacity of the sequential memory buffer is substantially less than that required to store both the reference frame and the comparison frame.

13. A method for producing a signal indicative of a relative movement between at least a portion of a pointing device and an adjacent surface, comprising the steps of:

(a) imaging the adjacent surface to produce image data;

(b) sequentially storing the image data in a memory buffer, the image data stored in the memory buffer corresponding to a reference frame;

(c) acquiring successive pixels of a comparison frame by imaging the adjacent surface, as the relative movement occurs between at least the portion of the pointing device and the adjacent surface, so that it is unnecessary to store said comparison frame in a separate memory buffer;

(d) determining a cross correlation between the reference frame stored in the memory buffer and the successive pixels of the comparison frame; and (e) as a function of the cross correlation, producing a signal indicative of the extent of the relative movement between at least the portion of the pointing device and the adjacent surface.

14. The method of claim 13, further comprising the step of determining an auto correlation using the image data for the reference frame stored in the memory buffer.

15. The method of claim 14, further comprising the step of determining a sub-pixel interpolation of the relative movement as a function of the auto correlation.

16. The method of claim 14, wherein the step of determining the auto correlation is carried out in parallel with the step of determining the cross correlation, for each successive pixel of the comparison frame.

17. The method of claim 13, further comprising the step of selectively reloading the buffer memory with image data for the reference frame.

18. The method of claim 13, further comprising the step of selectively loading the buffer memory with image data for a new reference frame, using the image data for the comparison frame.

19. The method of claim 18, further comprising the step of determining a velocity of the relative movement between at least the portion of the pointing device and the surface.

20. The method of claim 19, further comprising the step of determining whether to load the new reference frame into the buffer memory as a function of the velocity of the relative movement, said velocity being determinative of whether a meaningful cross correlation can be determined with successive comparison frames.

21. The method of claim 19, further comprising the step of loading the new reference frame into the buffer memory before the relative movement between at least the portion of the pointing device and the surface is sufficient to cause a subsequent comparison frame to no longer overlap the reference frame previously stored in the buffer memory.

22. The method of claim 13, further comprising the step of filtering the image data before determining the cross correlation.

23. The method of claim 13, wherein the image data for the reference frame are shifted through the buffer memory a pixel at a time, as the cross correlation is determined using each successive pixel of the comparison frame.

24. The method of claim 18, further comprising the step of providing additional temporary storage in the buffer memory for a last portion of the image data of a previous reference frame, so that the last portion of the image data of the previous reference frame remain available for use in determining the cross correlation as the new reference frame is loaded into the buffer memory.

25. The method of claim 24, further comprising the step of discarding successive pixel image data for the previous reference frame as the new reference frame is loaded into the buffer memory.

26. A machine readable medium that stores a plurality of machine instructions for performing the steps of claim 13.

27. A machine readable medium that stores a plurality of machine instructions for performing the steps of claim 14.

28. A user input device that is movable and which produces an output signal indicative of a movement of the user input device, for input to a computing device, comprising:
 (a) a housing that is movable relative to a surface;
 (b) an image sensor disposed in the housing and oriented so as to detect an image of the surface, producing a signal corresponding to pixel data for the image of the surface;
 (c) a buffer memory in which pixel data for a reference frame are stored, pixel data for said reference frame being sequentially shifted through the buffer memory; and
 (d) a processing circuit that is coupled to the image sensor and the buffer memory, said processing circuit implementing a plurality of functions, including:
  (i) selectively loading the pixel data for the reference frame into the buffer memory;
  (ii) determining a cross correlation between the reference frame and pixel data received from the image sensor as the user input device is moved over the surface, so that it is unnecessary to store the pixel data in a buffer memory prior to determining the cross correlation; and
  (iii) based upon the cross correlation, determining the movement of the user input device over the surface, producing a corresponding output signal indicative of said movement.

29. The user input device of claim 28, wherein the processing circuit further determines an auto correlation for the reference frame and modifies the output signal as a function of the auto correlation to include a sub-pixel interpolation for the movement of the user input device relative to the surface.

30. The user input device of claim 28, further comprising a light source disposed in the housing and oriented to illuminate the surface to enable the image sensor to detect the image of the surface.

31. The user input device of claim 28, further comprising a multiplexer that is coupled to the processing circuit, said multiplexer including an output coupled to an input of the buffer memory, a first input coupled to the image sensor, and a second input coupled to an output of the buffer memory, said multiplexer being controlled by the processing circuit to selectively determine whether the reference frame in the buffer memory is reloaded into the buffer memory, or that the comparison frame is loaded into the buffer memory as a new reference frame.

32. The user input device of claim 31, wherein the processing circuit causes the multiplexer to load the new reference frame if the movement of the user input device relative to the surface is about to result in a successive comparison frame no longer overlapping the reference frame that is currently stored in the buffer memory.

33. The user input device of claim 32, wherein the processing circuit determines a velocity with which the user input device is moving relative to the surface to determine when to cause the multiplexer to load the new reference frame into the buffer memory.

34. The user input device of claim 31, wherein the buffer memory is unable to store all of the pixel data for the reference frame and the comparison frame, at the same time.

35. The user input device of claim 28, further comprising a memory in which components of the cross correlation are stored while the cross correlation is being determined for the comparison frame.

36. The user input device of claim 28, wherein only pixel data within a correlation window are used in determining the cross correlation.

37. A motion sensing circuit for detecting movement relative to a surface, comprising:
 (a) an image sensor that produces a signal corresponding to pixel data for an image of the surface;
 (b) a shift memory in which the pixel data are selectively loaded;
 (c) a processing circuit that controls loading of pixel data into the shift memory and determines a cross correlation between the data previously loaded into the shift memory and pixel data for a subsequent image of the surface without first loading the pixel data for the subsequent image into a memory, the pixel data for successive pixels of the subsequent image being used to determine the cross correlation as the pixel data in the shift memory are sequentially moved through the shift memory, the relative movement being determined based upon the cross correlation thus determined.

38. The motion sensing circuit of claim 37, wherein the processing circuit reloads the shift memory with the pixel data previously loaded therein unless sufficient movement has occurred to require that new pixel data be loaded into the shift memory from the image sensor for use in subsequently determining the cross correlation.

39. The motion sensing circuit of claim 37, wherein the processing circuit also determines an auto correlation for the pixel data loaded into the shift memory.

40. The motion sensing circuit of claim 39, wherein the processing circuit further determines a sub-pixel interpolation for the relative movement as a function of the auto correlation.

41. The motion sensing circuit of claim 38, further comprising a switching device that is coupled to the shift memory and controlled by the processing circuit to either reload the pixel data that were previously loaded into the shift memory, or to load the new pixel data into the shift memory.

42. The motion sensing circuit of claim 41, wherein the processing circuit determines a velocity for the relative movement as a basis for determining when to load the new pixel data into the shift memory, said velocity being determinative of whether a meaningful cross correlation can be determined with successive comparison frames.

43. The motion sensing circuit of claim 38, wherein the shift memory is of sufficient size to store one frame of pixel data and a portion of the frame of pixel data, said portion being used to temporarily store a portion of the pixel data previously loaded into the shift memory for use with the new pixel data being loaded into the shift memory for determining the cross correlation.

44. The motion sensing circuit of claim 37, further comprising an electronic filter that is coupled to the image sensor for electronically filtering the pixel data from the image sensor.

45. A method for determining a sub-pixel interpolation component for relative movement between an object and an adjacent surface, comprising the steps of:
 (a) producing a signal corresponding to a pixelated image of the surface;
 (b) storing a reference frame for the surface that includes data for each of a plurality of pixels of the pixelated image, said reference frame being stored in a memory buffer that enables the data to be shifted through the memory buffer a pixel at a time;
 (c) as relative movement occurs between the object and the adjacent surface, producing a comparison frame that includes data for a plurality of pixels in a new pixelated image;
 (d) determining a cross correlation between the data for the reference frame and the data for the comparison frame as successive pixels of the data for the comparison frame are read from the pixilated image corresponding to the comparison frame as said data for the reference frame are shifted through the memory buffer;
 (e) determining an auto correlation of the data for the reference frame; and
 (f) determining the sub-pixel interpolation component for the relative movement as a function of both the cross correlation and the auto correlation.

46. The method of claim 45, further comprising the step of determining a pixel component of the relative motion as a function of the cross correlation.

47. The method of claim 46, further comprising the step of selecting one of a plurality of different predefined mathematical functions to use in determining the sub-pixel interpolation component, based upon a direction in which the relative movement has occurred, where each of the plurality of different predefined mathematical functions corresponds to a different direction of the relative movement.

48. A machine readable medium that stores a plurality of machine instructions for performing the steps of claim 45.

49. A machine readable medium that stores a plurality of machine instructions for performing the steps of claim 47.

50. A user controlled object that determines a sub-pixel interpolation component for relative movement between said object and an adjacent surface, comprising:
 (a) a pixelated image sensor that produces a signal corresponding to pixels of an image of a surface;
 (b) a memory in which data corresponding to the pixels of the image are stored, said data comprising a reference frame and being shifted through the memory;
 (c) a processing circuit that is coupled to the memory and to the pixelated image sensor, said processing circuit implementing a plurality of functions, including:
  (i) determining a cross correlation between the data for the reference frame stored in the memory and data for successive pixels of a comparison frame that corresponds to new data for the image of the surface, as the relative movement between the surface and the object occurs, said cross correlation being determined as successive pixels of the comparison frame are read from the pixelated image sensor and as pixels of the data for the reference frame are shifted through the memory;
  (ii) determining an auto correlation using the data for the reference frame that is stored in the memory; and
  (iii) determining the sub-pixel interpolation component for the relative movement as a function of both the cross correlation and the auto correlation.

51. The system of claim 50, wherein the processing circuit further determines a pixel component of the relative motion as a function of the cross correlation.

52. The system of claim 50, wherein the processing circuit further selects one of a plurality of different predefined mathematical functions to use in determining the sub-pixel interpolation component, based upon a direction in which the relative movement has occurred, where each of the plurality of different predefined mathematical functions corresponds to a different direction of the relative movement.

* * * * *